US012700964B2

(12) United States Patent
Bai et al.

(10) Patent No.: US 12,700,964 B2
(45) Date of Patent: Aug. 4, 2026

(54) SEQUENCE TRANSMISSION METHOD, SEQUENCE RECEIVING METHOD, TERMINAL, NETWORK DEVICE AND STORAGE MEDIUM

(71) Applicant: DATANG MOBILE COMMUNICATIONS EQUIPMENT CO., LTD., Beijing (CN)

(72) Inventors: Wei Bai, Beijing (CN); Yujie Zhang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 387 days.

(21) Appl. No.: 18/254,487

(22) PCT Filed: Nov. 23, 2021

(86) PCT No.: PCT/CN2021/132364
§ 371 (c)(1),
(2) Date: May 25, 2023

(87) PCT Pub. No.: WO2022/134987
PCT Pub. Date: Jun. 30, 2022

(65) Prior Publication Data
US 2024/0106593 A1     Mar. 28, 2024

(30) Foreign Application Priority Data
Dec. 25, 2020     (CN) .......................... 202011559604.1

(51) Int. Cl.
*H04L 5/00*          (2006.01)
*H04L 1/1607*        (2023.01)
(52) U.S. Cl.
CPC .......... *H04L 5/0048* (2013.01); *H04L 1/1621* (2013.01)

(58) Field of Classification Search
CPC ... H04L 5/0048; H04L 5/0058; H04L 5/0078; H04L 5/0091; H04L 5/0053;
(Continued)

(56) References Cited

U.S. PATENT DOCUMENTS

| | | | |
|---|---|---|---|
| 2006/0156203 A1 | 7/2006 | Naoi | |
| 2012/0327871 A1 | 12/2012 | Ghosh et al. | |
| 2017/0013647 A1* | 1/2017 | Uchino | H04W 74/0833 |
| 2018/0279363 A1* | 9/2018 | Su | H04W 72/20 |
| 2019/0045489 A1* | 2/2019 | He | H04L 1/1812 |

(Continued)

FOREIGN PATENT DOCUMENTS

| | | |
|---|---|---|
| CN | 108076532 A | 5/2018 |
| CN | 108541074 A | 9/2018 |

(Continued)

OTHER PUBLICATIONS

International Search Report and Written Opinion dated Jan. 30, 2022 issued in International Application No. PCT/CN2021/132364 (with English translation).

(Continued)

*Primary Examiner* — Phong La
(74) *Attorney, Agent, or Firm* — Harness, Dickey & Pierce, P.L.C.

(57)          ABSTRACT
The present disclosure discloses a sequence transmission method, a sequence receiving method, a terminal, a network device and a storage medium. The method includes: sending, by a terminal, a preamble sequence to a network device; wherein the preamble sequence is determined based on a first bit, and the first bit includes a CRC bit of user data, and the user data includes at least one of user identity information or data.

18 Claims, 3 Drawing Sheets

12 network device

11 terminal

(58) Field of Classification Search

CPC ..... H04L 5/0042; H04L 5/0037; H04L 5/003; H04L 5/0032; H04L 1/1621; H04L 1/1628; H04L 1/1635; H04L 1/1642; H04L 1/1671; H04L 1/1658; H04L 1/1692

See application file for complete search history.

(56) References Cited

U.S. PATENT DOCUMENTS

| | | | | |
|---|---|---|---|---|
| 2019/0182665 | A1 * | 6/2019 | Edge | H04W 12/06 |
| 2019/0320467 | A1 * | 10/2019 | Freda | H04L 5/0055 |
| 2020/0383138 | A1 * | 12/2020 | Cao | H04W 74/002 |
| 2021/0028905 | A1 * | 1/2021 | Lei | H04L 5/0044 |
| 2024/0106593 | A1 * | 3/2024 | Bai | H04L 1/1621 |

FOREIGN PATENT DOCUMENTS

| | | | | | |
|---|---|---|---|---|---|
| CN | 108696340 | A | * | 10/2018 | H04L 5/0055 |
| CN | 109168147 | A | | 1/2019 | |
| CN | 109845378 | A | | 6/2019 | |
| CN | 110545110 | B | * | 10/2020 | H03M 13/09 |
| CN | 112839378 | A | * | 5/2021 | H04W 72/23 |
| WO | WO-2016060825 | A1 | * | 4/2016 | H04L 1/0061 |
| WO | WO-2016/101364 | A1 | | 6/2016 | |

OTHER PUBLICATIONS

Chinese Office Action dated Jul. 1, 2023 issued in corresponding Chinese Patent Application No. 202011559604.1 (with English translation).

"Single beam RACH evaluation." Qualcomm Incorporated, R1-1612032. 3GPP TSG-RAN WG1 #87, Nov. 14-18, 2016, Reno, USA.

Extended European Search report issued May 10, 2024 in European Application No. 21908986.9.

ZTE et al., "On the receiver design of grant-free MUSA," 3GPP TSG RAN WG1 Meeting 91, R1-1720221, Nov. 18, 2017.

* cited by examiner network device

11 terminal sending, by a terminal, a preamble sequence to a network device; wherein the preamble sequence is determined based on a first bit, and the first bit includes a CRC bit of user data, and the user data includes at least one of user identity information and data

201

600

700

SEQUENCE TRANSMISSION METHOD, SEQUENCE RECEIVING METHOD, TERMINAL, NETWORK DEVICE AND STORAGE MEDIUM

CROSS-REFERENCE TO RELATED APPLICATIONS

This application is the U.S. national phase of PCI Application No. PCT/CN2021/132364 filed on Nov. 23, 2021, which claims priority of the Chinese patent application No. 202011559604.1 filed on Dec. 25, 2020, which are incorporated herein by reference in their entireties.

TECHNICAL FIELD

The present disclosure relates to the field of communication technology, in particular to a sequence transmission method, a receiving method, a terminal, a network device and a storage medium.

BACKGROUND

With the development of communication technology, the number of network access terminals increases rapidly. For example: Some organizations predict that the density of connected terminals may reach tens of millions per square kilometer in the future. At present, the preamble sequence sent by the terminal is randomly selected, and after sending the randomly selected preamble sequence, it is necessary to send the cyclic redundancy check (CRC) bit of the user data to the network device multiple times, which causes too big transmission overhead.

SUMMARY

The present disclosure aims to provide a sequence transmission method, a receiving method, a terminal, a network device and a storage medium, so as to solve the problem of too much transmission overhead.

An embodiment of the present disclosure provides a sequence transmission method, includes: sending, by a terminal, a preamble sequence to a network device; wherein the preamble sequence is determined based on a first bit, and the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, and a control information bit corresponding to the user data.

In an embodiment of the present disclosure, the preamble sequence includes: a preamble sequence or a preamble sequence set determined according to an encoded codeword of the first bit; wherein the encoded codeword includes: a codeword obtained by encoding the first bit; or segments of a codeword obtained by encoding the first bit; or codewords respectively obtained by encoding segments of the first bits; or a concatenation of codewords respectively obtained by encoding the segments of the first bits.

In an embodiment of the present disclosure, the method further includes: sending, by the terminal, the user data to the network device, wherein a sending format of the user data is a sending format determined based on the first bit.

In an embodiment of the present disclosure, the sending, by the terminal, the preamble sequence to the network device, includes: sending periodically, by the terminal, the preamble sequence to the network device until a number of sending times of the preamble sequence reaches a maximum number or receives confirmation information sent by the network device, wherein the confirmation information is used to indicate that the network device correctly receives the user data.

In an embodiment of the present disclosure, the method further includes: detecting, by the terminal, the confirmation information sent by the network device within a time window; wherein the confirmation information is used to implicitly or explicitly indicate a sequence number of the preamble sequence.

In an embodiment of the present disclosure, the sending, by the terminal, user data to the network device comprises: sending the user data to the network device on K resources using a Pattern Division Multiple Access (PDMA) mode or a non-orthogonal multiple access (NOMA) mode, wherein K is an integer greater than or equal to 1; wherein, a PDMA sequence of the PDMA mode is determined based on the first bit, and the PDMA sequence includes K elements corresponding to the K resources in a one-to-one manner, and a transmission state of each resource in the K resources is determined by a corresponding element.

In an embodiment of the present disclosure, the method further includes: receiving, by the terminal, configuration information sent by the network device, wherein the configuration information is used to configure at least one of the following: a resource location of the preamble sequence, a sending period of the preamble sequence, a resource location of the user data, or a number of transmission times of the user data.

An embodiment of the present disclosure provides a sequence receiving method, including: detecting, by a network device, a preamble sequence sent by a terminal; decoding, by the network device, the preamble sequence to obtain a first bit; wherein, the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, a control information bis corresponding to the user data.

In an embodiment of the present disclosure, the method further includes: obtaining, by the network device, the user data sent by the terminal, wherein a sending format of the user data is a sending format determined based on the first bit; verifying, by the network device, the user data according to the first bit.

In an embodiment of the present disclosure, the method further includes: if the verification is passed, sending, by the network device, confirmation information to the terminal, wherein the confirmation information is used to instruct the network device to correctly receive the user data.

In an embodiment of the present disclosure, the confirmation information is used to implicitly or explicitly indicate a sequence number of the preamble sequence.

In an embodiment of the present disclosure, the obtaining, by the network device, user data sent by the terminal includes: obtaining, by the network device, the user data sent by the terminal on K resources according to a PDMA mode or an NOMA mode; wherein, a PDMA sequence of the PDMA mode is determined based on the first bit, and the PDMA sequence includes K elements corresponding to the K resources in a one-to-one manner, and a transmission state of each resource in the K resources is determined by a corresponding element.

In an embodiment of the present disclosure, the method further includes: sending, by the network device, configuration information to the terminal, wherein the configuration information is used to configure at least one of the following: a resource location of the preamble sequence, a sending period of the preamble sequence, a resource location of the user data, or a number of transmission times of the user data.

An embodiment of the present disclosure provides a terminal, including: a memory, a transceiver, and a processor, wherein: the memory is used to store computer programs; the transceiver is used to send and receive data under the control of the processor; the processor is used to read the computer programs in the memory and perform the following operations: sending a preamble sequence to a network device; wherein the preamble sequence is determined based on a first bit, and the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, and a control information bit corresponding to the user data.

In an embodiment of the present disclosure, the preamble sequence comprises: a preamble sequence or a preamble sequence set determined according to an encoded codeword of the first bit; wherein the encoded codeword includes: a codeword obtained by encoding the first bit; or segments of a codeword obtained by encoding the first bit; or codewords respectively obtained by encoding segments of the first bits; or a concatenation of codewords respectively obtained by encoding the segments of the first bits.

An embodiment of the present disclosure provides a network device, including: a memory, a transceiver, and a processor, wherein: the memory is used to store computer programs; the transceiver is used to send and receive data under the control of the processor; the processor is used to read the computer programs in the memory and perform the following operations: detecting a preamble sequence sent by a terminal; decoding the preamble sequence to obtain a first bit; wherein, the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, a control information bis corresponding to the user data.

In an embodiment of the present disclosure, the processor is further configured to: obtain the user data sent by the terminal, wherein a sending format of the user data is a sending format determined based on the first bit; verifying the user data according to the first bit.

An embodiment of the present disclosure provides a terminal, including: a first sending unit, configured to send a preamble sequence to a network device; wherein the preamble sequence is determined based on a first bit, and the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, and a control information bit corresponding to the user data.

An embodiment of the present disclosure provides a network device, including: a detection unit, configured to detect a preamble sequence sent by a terminal; a decoding unit, configured to decode the preamble sequence to obtain a first bit; wherein, the first bit includes a cyclic redundancy check (CRC) bit of user data, and the user data includes at least one of user identity information or data.

In an embodiment of the present disclosure, the first bit is the CRC bit; or the first bit is the CRC bit and a second bit, and the second bit includes at least one of a signature sequence number bit, partial data bits of the user data, a control information bis corresponding to the user data.

An embodiment of the present disclosure provides a processor-readable storage medium, wherein the processor-readable storage medium stores a computer program, the computer program is used to enable the processor to execute the sequence transmission method; or the computer program is used to make the processor execute the sequence receiving method.

In an embodiment of the present disclosure, the terminal sends a preamble sequence to the network device; wherein, the preamble sequence is determined based on a first bit, the first bit includes a CRC bit of user data, and the user data includes at least one of user identity information and data. Since the preamble sequence is determined based on the first bit, the network device can decode the preamble sequence to obtain the first bit, thereby reducing the number of transmission times of CRC bits by the terminal, to save transmission overhead.

DETAILED DESCRIPTION

In order to make the technical problems, technical solutions and advantages to be solved by the present disclosure clearer, the following will describe in detail with reference to the drawings and specific embodiments.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality" in the embodiments of the present disclosure refers to two or more, and other quantifiers are similar.

The following will clearly and completely describe the technical solutions in the embodiments of the present disclosure with reference to the accompanying drawings. Obviously, the described embodiments are only some of them. Based on the embodiments in the present disclosure, all other embodiments obtained by persons of ordinary skill in the art without making creative efforts belong to the scope of protection of the present disclosure.

Embodiments of the present disclosure provide a sequence transmission method, a receiving method, a terminal, a network device, and a storage medium, so as to solve the problem of excessive transmission overhead.

The method and the device are conceived based on the same disclosure. Since the method and the device have similar problem-solving principles, the implementation of the device and the method can be referred to each other, and the repetition will not be repeated.

The technical solutions provided by the embodiments of the present disclosure may be applicable to various systems, especially 6G systems. For example, the applicable system may be global system of mobile communication (GSM) system, code division multiple access (CDMA) system, wideband code division multiple access (WCDMA) general packet Wireless service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G new radio (NR) system, 6G system, etc. These various systems include terminal devices and network devices. The system may also include a core network, such as an evolved packet system (EPS), a 5G system (5GS), and the like.

Figures 1, 2:
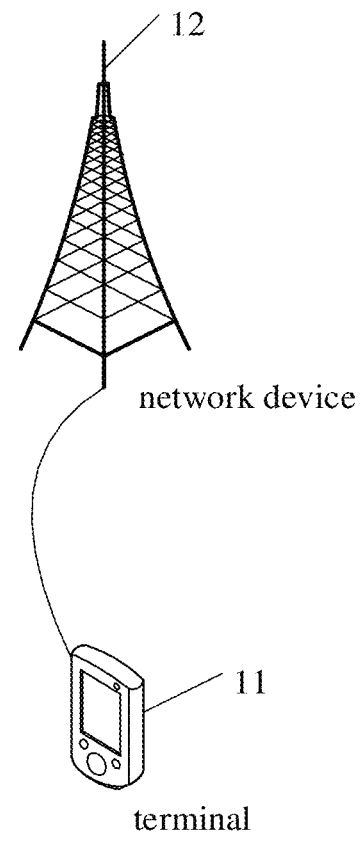
FIG. 1 is a schematic structural diagram of an applicable network architecture according to an embodiment of the present disclosure.
FIG. 2 is a flowchart of a sequence transmission method according to an embodiment of the present disclosure.

FIG. 1 is a schematic structural diagram of a network architecture applicable to the embodiments of the present disclosure. As shown in FIG. 1, it includes a terminal 11 and a network device 12.

Wherein, the terminal involved in the embodiments of the present disclosure may be a device that provides voice and/or data connectivity to users, a handheld device with a wireless connection function, or other processing devices connected to a wireless modem. In different systems, the name of the terminal equipment may be different. For example, in a 5G system, the terminal equipment may be called user equipment (UE). Wireless terminal equipment can communicate with one or more core networks (CN) via a radio access network (RAN). The wireless terminal equipment can be a mobile terminal equipment, such as a mobile phone (or called a "cellular" telephones) and computers with mobile terminal equipment, such as portable, pocket, handheld, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA), Redcap terminal and other devices. Wireless terminal equipment can also be called system, subscriber unit, subscriber station, mobile station, mobile station, remote station, access point, a remote terminal, an access terminal, a user terminal, a user agent, and a user device, which are not limited in the embodiments of the present disclosure.

The network device involved in the embodiments of the present disclosure may be a base station, and the base station may include multiple cells that provide services for terminals. Depending on the specific application, the base station can also be called an access point, or it can be a device in the access network that communicates with the wireless terminal device through one or more sectors on the air interface, or other names. Network devices can be used to interchange received over-the-air frames with Internet Protocol (IP) packets and act as routers between wireless terminal devices and the rest of the access network, which can include the IP communication network. Network devices may also coordinate attribute management for the air interface. For example, the network device involved in this embodiment of the present disclosure may be a network device (Base Transceiver Station, BTS) in Global System for Mobile communications (GSM) or Code Division Multiple Access (CDMA), or a network device (NodeB) in Wide-band Code Division Multiple Access (WCDMA), or an evolved network device (evolutional Node B, eNB or e-NodeB) in a long term evolution (LTE) system, 5G base station (gNB) in the 5G network architecture (next generation system), a base station in 6G, or Home evolved Node B (HeNB), a relay node, a home base station (femto), a pico base station (pico), etc. which are not limited in this embodiment of the present disclosure. In some network structures, a network device may include a centralized unit (CU) node and a distributed unit (DU) node, and the centralized unit and the distributed unit may also be arranged geographically separately.

One or more antennas can be used between network devices and terminals for Multi Input Multi Output (MIMO) transmission. MIMO transmission can be Single User MIMO (SU-MIMO) or Multi-User MIMO (MU-MIMO). According to the shape and number of root antenna combinations, MIMO transmission can be 2D-MIMO, 3D-MIMO, FD-MIMO, or massive-MIMO, or diversity transmission, precoding transmission, or beamforming transmission, etc.

FIG. 2 is a flowchart of a sequence transmission method provided by an embodiment of the present disclosure. As shown in FIG. 2, it includes the following steps:

Step 201, sending, by a terminal, a preamble sequence to a network device;

Wherein, the preamble sequence is determined based on a first bit, and the first bit includes a CRC bit of user data, and the user data includes at least one of user identity information and data.

The preamble sequence may be one or more preamble sequences selected by the terminal in the preamble sequence pool based on the first bit, or selected one or more preamble sequence sets.

The user identity information may include user identification information, for example: the user identity information includes: International Mobile Subscriber Identity (IMSI), IP address, Media Access Control (MAC) address or geographic location information.

The CRC bits may be obtained by performing CRC encoding on the user data to obtain CRC check bits. The data may be data that the terminal needs to send, for example, high-level data. And the user data does not include CRC bits. In some implementation, when the terminal has a large block of high-level data, it can be segmented by the radio link control (RLC) layer or other layers, and user identity information is added to each segment of data.

Through the above steps, the preamble sequence sent by the terminal can be determined based on the first bit, and the first bit includes the CRC bit of the user data, so that after the network device detects the preamble sequence, it decodes the preamble sequence to obtain the first bits, thereby reducing the number of times the terminal transmits CRC bits, to save transmission overhead. Further, since the user data may include user identity information, the network device may also implement verification of user identity information based on the first bit.

As an optional implementation, the first bit is the CRC bit; or

The first bit is the CRC bit and a second bit, and the second bit includes at least one of signature sequence number bits, partial data bits of the user data, and control information bits corresponding to the user data.

The signature sequence number bits may be NOMA signature sequence numbers, and the control information bits corresponding to the user data may be control information bits for controlling the transmission of the user data.

As an optional implementation, the preamble sequence includes:

A preamble sequence or a preamble sequence set determined according to an encoded codeword of the first bit;

Wherein, the encoded codeword includes:

a codeword obtained by encoding the first bit; or segments of a codeword obtained by encoding the first bit; or Codewords respectively obtained by encoding segments of the first bits; or A concatenation of codewords respectively obtained by encoding the segments of the first bits.

The preamble sequence or the preamble sequence set determined according to the codeword of the first bit may be the sequence number of the preamble sequence determined according to the encoded codeword of the first bit, and the preamble sequence number or the preamble sequence set is selected in the preamble sequence resource pool according to the sequence number.

In this implementation, the preamble sequence can be determined through different codewords of the first bit.

In an implementation, the preamble sequence may also be a preamble sequence or a preamble sequences set selected from the preamble sequence resource pool according to a mapping sequence number of the first bit. The mapping sequence number may be the sequence number to which the first bit is directly mapped, or the sequence number to which the first bit is segmented and mapped. For example: the 16-bit CRC check bit is directly mapped to one of the 64K sequence numbers, and for another example: the 16-bit CRC check bit is divided into 2 segments, each segment has 8 bits, and each segment is mapped to one of the 128 sequence numbers.

In an implementation, the preamble sequence may be a preamble sequence defined in a protocol (for example: NR protocol), or the number and length defined in the protocol (for example: NR protocol) may be further enhanced.

As an optional implementation, the method also includes:

Sending, by the terminal, user data to the network device, wherein a sending format of the user data is a sending format determined based on the first bit.

Wherein, the sending format may include a mapping mode, and may also include a format of at least one of scrambling, interleaving, modulation, spread spectrum, and precoding. Specifically, the corresponding relationship between the first bit and the sending format may be pre-configured, or the corresponding relationship between the encoded codeword of the first bit and the sending format, so as to determine the sending format based on the corresponding relationship.

In this embodiment, since the sending format of the user data is determined based on the first bit, the sending performance of the user data can be improved.

It should be noted that the embodiment of the present disclosure does not limit that the sending format of the user data is determined based on the first bit, for example, the sending format of the user data may be a sending format defined in the protocol.

Optionally, the sending, by the terminal, the user data to the network device includes:

sending the user data to the network device on K resources using a PDMA mode or an NOMA mode, wherein K is an integer greater than or equal to 1;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

The PDMA sequence may be determined based on the codeword of the first bit, wherein, the codeword of the first bit may refer to the corresponding description, and details are not repeated here. For example: the PDMA sequence is selected in the PDMA sequence pool according to the first bit.

The PDMA sequence may be a sequence composed of 0, 1, −1, −j and j elements, 1 indicates direct transmission on the corresponding resource, 0 indicates no transmission on the corresponding resource, and −1 indicates transmission with 180 degree of phase rotation on the corresponding resource, j indicates transmission with 90 degree of phase rotation on the corresponding resource, and −j indicates transmission with 270 degree of phase rotation on the corresponding resource.

In addition, when the user data is transmitted to the network device on K resources in a PDMA mode, spectrum spreading may be performed on each user data or each segmented transmission.

In the above embodiment, since the PDMA sequence is determined based on the first bit, the transmission state of the user data can be related to the first bit, so that the network device can correctly obtain the user data according to the first bit, thereby improving the transmission performance of the user data.

The transmission of the user data to the network device on the K resources in the NOMA mode may be that the spectrum spreading is performed on the user data by using the NOMA signature sequence, and the user data is transmitted to the network device on the K resources.

In addition, the encoding length of the user data can be set according to one resource, the user data is repeatedly transmitted K times on the K resources, and the redundancy version (RV) of each repeated transmission can be different or the same. For example, user data sets the encoding length according to one resource, performs spectrum spreading on each modulation symbol according to the PDMA sequence, and maps them sequentially.

Alternatively, the encoding degree of the user data may be set according to K resources, and the user data is transmitted in K segments on the K resources, that is, K segmented transmission of one encoding are performed on the K resources. Each segment corresponds to an element of the PDMA sequence. For example, if an element of the PDMA is j, all data in the segment corresponding to the element is multiplied by j, which is equivalent to rotating the constellation point of the data by 90°.

In addition, the transmission of the user data may be to encode the user data, and after at least one operation of scrambling, interleaving, modulation, spectrum spreading, precoding, etc., map the user data to the K resources using the PDMA mode or the NOMA mode. The encoding the user data may be to only encode the data bits without encoding the CRC check bits.

It should be noted that, in the embodiment of the present disclosure, it is not limited that the PDMA sequence is determined based on the first bit, for example: the PDMA sequence may be preconfigured.

As an optional implementation, the sending, by the terminal, the preamble sequence to the network device, including:

Sending periodically, by the terminal, the preamble sequence to the network device until the number of sending the preamble sequence reaches a maximum number or receives confirmation information sent by the network device, wherein the confirmation information is used to indicate that the network device correctly receives the user data.

The confirmation information may be an acknowledged (ACK) message.

The maximum number of sending times may be configured by a network device or defined by a protocol.

In this embodiment, the preamble sequence can be sent periodically, and the maximum number of sending times can be directly reached or confirmation information can be received, thereby saving transmission resources.

Optionally, the method also includes:

Detecting, by the terminal, the confirmation information sent by the network device within a time window.

The time window may be a time window after the preamble sequence is sent for the first time. For example: the time window can start from the symbol where the preamble sequence is sent for the first time+n1 OFDM symbols, and end with the last resource of the maximum number of the sending times of maximum preamble sequence+n1 OFDM symbols, where n1 is an integer greater than or equal to 1.

In addition, if the confirmation information is received within the time window, the time window will automatically end, and it is determined that the access is successful and the above user data is successfully sent; if the confirmation information is not received within the time window, then it is determined that the access fails, and the user terminal fails to send. And after it is determined that the access fails, other access methods or other data transmission procedures may be selected, or an error reporting mechanism may be activated.

Optionally, the confirmation information is used to implicitly or explicitly indicate the sequence number of the preamble sequence.

Since the confirmation information indicates the sequence number of the preamble sequence, the terminal can determine the user data targeted by the confirmation information according to the sequence number, thereby further improving the reliability of data transmission.

As an optional implementation, the method also includes:

Receiving, by the terminal, configuration information sent by the network device, and the configuration information is used to configure at least one of the following:

a resource location of the preamble sequence, a sending period of the preamble sequence, a location of the data resource, and a number of transmission times.

The configuration information may be configuration information received on a synchronization channel or a broadcast channel.

The configuration information may be access transmission configuration information of a cell obtained during the downlink time-frequency synchronization process performed by the terminal. For example, the terminal is performing a cell search process, realizing downlink time-frequency synchronization of the terminal, and obtaining access transmission configuration information of the cell.

Wherein, the resource position of the preamble sequence may be the resource occupied by the preamble sequence in the system frame or frame or slot, and may include a starting position and size of the resource.

The preamble sequence sending period is a sending period of the preamble sequence, and may be in a unit of an Orthogonal Frequency Division Multiplexing (OFDM) symbol or a slot.

The data resource location may be a data resource location within the sending period, for example: the data resource location includes specific indications of the K resource locations, specifically including the starting location and size of each resource; or the data resource location includes K consecutive resource positions starting from a next OFDM symbol at the end of the preamble sequence.

In addition, the resource position of the preamble sequence and the data resource position can be determined according to the coverage performance of the cell, so as to improve the terminal access performance.

The number K of transmission times may be the number of data segment transmissions or the number of repeated transmissions within one preamble sequence sending period T.

Further, the configuration information may also include transmission mode information of at least one of preamble sequence and user data.

In an embodiment of the present disclosure, the terminal sends a preamble sequence to the network device; wherein, the preamble sequence is determined based on a first bit, the first bit includes a CRC bit of user data, and the user data includes at least one of user identity information and data. Since the preamble sequence is determined based on the first bit, the network device can decode the preamble sequence to obtain the first bit, thereby reducing the number of transmission times of CRC bits by the terminal, to save transmission overhead.

In addition, in the embodiments of the present disclosure, the process of the terminal sending the preamble sequence and the user data does not require the coordination of the network device, so that a huge number of terminals access can be supported. In addition, in the embodiments of the present disclosure, since the preamble sequence is related to the user data, the success rate of accessing and transmitting user data can be similar, and the waste of resources caused by the success rate of access being significantly higher than the success rate of data transmission can be avoided.

In addition, the embodiment of the present disclosure only encodes user data, instead of encoding user data and CRC bits, which realizes low code rate encoding, especially when the coded data needs to be repeatedly transmitted, the code rate is lower, thereby improving the performance of data transmission.

Figure 3:
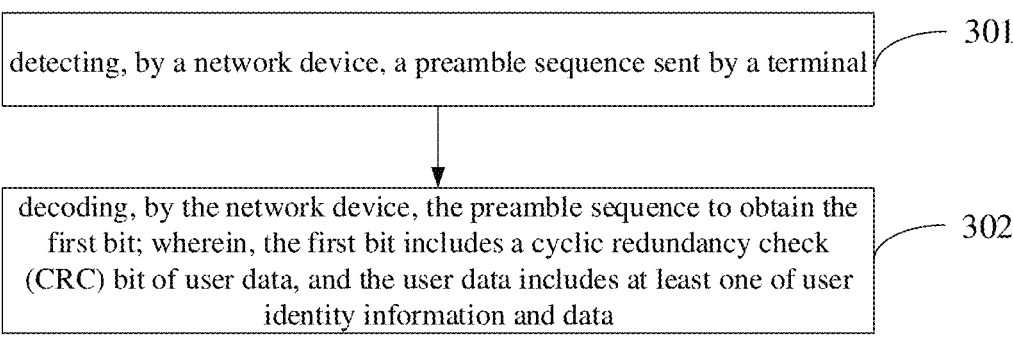
FIG. 3 is a flowchart of a sequence receiving method according to an embodiment of the present disclosure.

FIG. 3 is a flowchart of a sequence receiving method provided by an embodiment of the present disclosure. As shown in FIG. 3, it includes the following steps:

Step 301, detecting, by a network device, a preamble sequence sent by a terminal;

Step 302, decoding, by the network device, the preamble sequence to obtain the first bit;

Wherein, the first bit includes a cyclic redundancy check (CRC) bit of user data, and the user data includes at least one of user identity information and data.

Wherein, the network device decodes the preamble sequence to obtain the first bit, and may perform detection on the preamble sequence to obtain the sequence number of the preamble sequence, and determine the first bit according to the sequence number, for example: the sequence number of the preamble sequence is decoded or mapped to obtain the first bit.

Optionally, the first bit is the CRC bit; or the first bit is the CRC bit and a second bit, and the second bit includes at least one of a signature sequence number bit, a partial data bit of the user data, control information bits corresponding to the user data.

Optionally, the method also includes:

Obtaining, by the network device, the user data sent by the terminal, and a sending format of the user data is a sending format determined based on the first bit;

Verifying, by the network device, the user data according to the first bit.

The network device obtaining the user data sent by terminal may be to receive the signal on the corresponding resource according to the sending format, and perform reverse processing on at least one of scrambling, interleaving, modulation, spectrum spreading, precoding, etc. on the received signal, and then decoding, so as to obtain the user terminal.

The verification of the user data by the first bit may be at least one of CRC verification and verification of the second bit.

If the verification is passed, a confirmation message is sent to the terminal, and if the verification is not passed, the above step S301 can be repeated in the next period.

In addition, the network device can also perform channel estimation using the preamble sequence.

Optionally, the network device obtaining user data sent by the terminal includes:

Obtaining, by the network device, the user data sent by the terminal on K resources according to a PDMA mode or an NOMA mode;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

Wherein, for the PDMA mode or NOMA mode, reference may be made to the corresponding description on the terminal side, which will not be repeated here.

Optionally, the method also includes:

If the verification is passed, sending, by the network device, confirmation information to the terminal, wherein the confirmation information is used to instruct the network device to correctly receive the user data.

Wherein, the network device sending the confirmation information to the terminal may send the confirmation information within a time window.

Optionally, the confirmation information is used to implicitly or explicitly indicate the sequence number of the preamble sequence.

Optionally, the method also includes:

Sending, by the network device, configuration information to the terminal, wherein the configuration information is used to configure at least one of the following:

a resource location of the preamble sequence, a sending period of the preamble sequence, a resource location of the user data, or a number of transmission times of the user data.

It should be noted that this embodiment is an implementation of a network device corresponding to the embodiment shown in FIG. 2. The same beneficial effect can also be achieved, the specific implementation may refer to those shown in FIG. 2 and will not be repeated herein.

Figure 4:
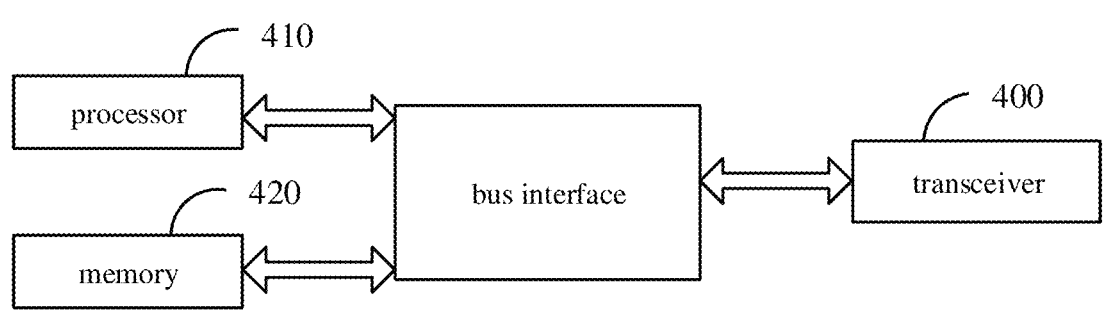
FIG. 4 is a structural diagram of a terminal according to an embodiment of the present disclosure.

FIG. 4 is a structural diagram of a terminal provided by an embodiment of the present disclosure. As shown in FIG. 4, it includes a memory 420, a transceiver 400, and a processor 410:

The memory 420 is used to store computer programs; the transceiver 400 is used to send and receive data under the control of the processor 410; the processor 410 is used to read the computer programs in the memory 420 and perform the following operations:

sending a preamble sequence to a network device;

Wherein, the preamble sequence is determined based on a first bit, and the first bit includes a CRC bit of user data, and the user data includes at least one of user identity information and data.

Wherein, in FIG. 4, the bus architecture may include any number of interconnected buses and bridges, specifically various circuits of one or more processors represented by the processor 410 and the memory represented by the memory 420 are linked together. The bus architecture can also link together various other circuits such as peripherals, voltage regulators, and power management circuits, etc., which are well known in the art and therefore will not be further described herein. The bus interface provides the interface. Transceiver 400 may be a plurality of elements, including a transmitter and a receiver, providing a unit for communicating with various other devices over transmission medium, including wireless channels, wired channels, fiber optic cables, etc. For different user equipments, the user interface 430 may also be an interface capable of connecting externally and internally to required equipment, and the connected equipment includes but not limited to a keypad, a display, a speaker, a microphone, a joystick, and the like.

The processor 410 is responsible for managing the bus architecture and general processing, and the memory 420 may store data used by the processor 400 when performing operations.

Optionally, the processor 410 may be a central processor (CPU), Application Specific Integrated Circuit (ASIC), Field-Programmable Gate Array (FPGA) or Complex Programmable Logic Device (CPLD), the processor can also adopt a multi-core architecture.

The processor is used to execute any one of the methods provided by the embodiments of the present disclosure according to the obtained executable instructions by calling the computer program stored in the memory. The processor and memory may also be physically separated.

Optionally, the first bit is the CRC bit; or the first bit is the CRC bit and a second bit, and the second bit includes at least one of signature sequence number bits, partial data bits of the user data, and control information bits corresponding to the user data.

Optionally, the preamble sequence includes:

A preamble sequence or a preamble sequence set determined according to an encoded codeword of the first bit;

Wherein, the encoded codeword includes:

a codeword obtained by encoding the first bit; or segments of a codeword obtained by encoding the first bit; or Codewords respectively obtained by encoding segments of the first bits; or A concatenation of codewords respectively obtained by encoding the segments of the first bits.

Optionally, the processor 410 is also used for:

Sending user data to the network device, wherein a sending format of the user data is a sending format determined based on the first bit.

Optionally, the sending the preamble sequence to the network device includes:

Sending periodically, by the terminal, the preamble sequence to the network device until the number of sending the preamble sequence reaches a maximum number or receives confirmation information sent by the network device, wherein the confirmation information is used to indicate that the network device correctly receives the user data.

Optionally, the processor 410 is also used for:

Detecting, by the terminal, the confirmation information sent by the network device within a time window.

Wherein, the confirmation information is used to implicitly or explicitly indicate the sequence number of the preamble sequence.

Optionally, the sending user data to the network device includes:

sending the user data to the network device on K resources using a PDMA mode or an NOMA mode, wherein K is an integer greater than or equal to 1;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

Optionally, the processor 410 is also used for:

Receiving, by the terminal, configuration information sent by the network device, and the configuration information is used to configure at least one of the following:

a resource location of the preamble sequence, a sending period of the preamble sequence, a resource location of the user data, or a number of transmission times of the user data.

What needs to be explained here is that the terminal provided by the embodiment of the present disclosure can implement all the method steps implemented by the method embodiment, and can achieve the same technical effect. The same part and the beneficial effect are not described in detail.

Figure 5:
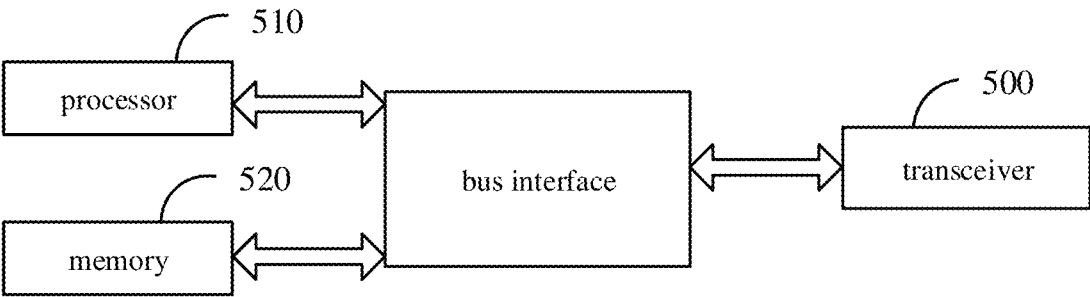
FIG. 5 is a structural diagram of a network device according to an embodiment of the present disclosure.

FIG. 5 is a structural diagram of a network device provided by an embodiment of the present disclosure. As shown in FIG. 5, it includes a memory 520, a transceiver 500, and a processor 510:

The memory 520 is used to store computer programs; the transceiver 500 is used to send and receive data under the control of the processor 510; the processor 510 is used to read the computer programs in the memory 520 and perform the following operations:

detecting a preamble sequence sent by a terminal;

decoding the preamble sequence to obtain the first bit;

Wherein, the first bit includes a cyclic redundancy check (CRC) bit of user data, and the user data includes at least one of user identity information and data.

Wherein, in FIG. 5, the bus architecture may include any number of interconnected buses and bridges, specifically various circuits of one or more processors represented by the processor 510 and the memory represented by the memory 520 are linked together. The bus architecture can also link together various other circuits such as peripherals, voltage regulators, and power management circuits, etc., which are well known in the art and therefore will not be further described herein. The bus interface provides the interface. Transceiver 500 may be a plurality of elements, including a transmitter and a receiver, providing means for communicating with various other devices over transmission media, including wireless channels, wired channels, fiber optic cables, etc. For different user equipments, the user interface 530 may also be an interface capable of connecting externally and internally to required equipment, and the connected equipment includes but not limited to a keypad, a display, a speaker, a microphone, a joystick, and the like.

The processor 510 is responsible for managing the bus architecture and general processing, and the memory 520 may store data used by the processor 500 when performing operations.

Optionally, the processor 510 may be a CPU, ASIC, FPGA or CPLD, the processor can also adopt a multi-core architecture.

The processor is used to execute any one of the methods provided by the embodiments of the present disclosure according to the obtained executable instructions by calling the computer program stored in the memory. The processor and memory may also be physically separated.

Optionally, the first bit is the CRC bit; or the first bit is the CRC bit and a second bit, and the second bit includes a signature sequence number bit and a partial data bit of the user data, at least one of the control information bits corresponding to the user data.

Optionally, the processor 510 is also used for:

obtaining user data sent by the terminal, wherein the sending format of the user data is a sending format determined based on the first bit;

verifying, by the network device, the user data according to the first bit.

Optionally, the processor 510 is also used for:

If the verification is passed, sending, by the network device, confirmation information to the terminal, wherein the confirmation information is used to instruct the network device to correctly receive the user data.

Optionally, the confirmation information is used to implicitly or explicitly indicate the sequence number of the preamble sequence.

Optionally, the obtaining the user data sent by the terminal includes:

Obtaining, by the network device, the user data sent by the terminal on K resources according to a PDMA mode or an NOMA mode;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

Optionally, the processor 510 is also used for:

Sending configuration information to the terminal, wherein the configuration information is used to configure at least one of the following:

a resource location of the preamble sequence, a sending period of the preamble sequence, a resource location of the user data, or a number of transmission times of the user data.

What needs to be explained here is that the network device provided by the embodiments of the present disclosure can implement all the method steps implemented by the method embodiments, and can achieve the same technical effect. The same parts and beneficial effects are not described in detail.

Figure 6:
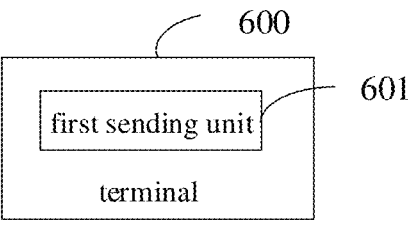
FIG. 6 is another structural diagram of a terminal according to an embodiment of the present disclosure.

FIG. 6 is another structural diagram of a terminal provided by an embodiment of the present disclosure. As shown in FIG. 6, a terminal 600 includes:

A first sending unit 601, configured to send a preamble sequence to a network device;

Wherein, the preamble sequence is determined based on a first bit, and the first bit includes a CRC bit of user data, and the user data includes at least one of user identity information and data.

Optionally, the first bit is the CRC bit; or the first bit is the CRC bit and a second bit, and the second bit includes at least one of signature sequence number bits, partial data bits of the user data, and control information bits corresponding to the user data.

Optionally, the preamble sequence includes:

A preamble sequence or a preamble sequence set determined according to an encoded codeword of the first bit;

Wherein, the encoded codeword includes:

a codeword obtained by encoding the first bit; or segments of a codeword obtained by encoding the first bit; or Codewords respectively obtained by encoding segments of the first bits; or A concatenation of codewords respectively obtained by encoding the segments of the first bits.

Optionally, the device also includes:

A second sending unit, configured to send user data to the network device, wherein a sending format of the user data is a sending format determined based on the first bit.

Optionally, the first sending unit 601 is configured to periodically send the preamble sequence to the network device until the number of sending the preamble sequence reaches a maximum number or receives confirmation information sent by the network device, wherein the confirmation information is used to indicate that the network device correctly receives the user data.

Optionally, the device also includes:

a detection unit, configured to detect the confirmation information sent by the network device within a time window;

Wherein, the confirmation information is used to implicitly or explicitly indicate the sequence number of the preamble sequence.

Optionally, the second sending unit is configured to send the user data to the network device on K resources using a PDMA mode or an NOMA mode, wherein K is an integer greater than or equal to 1;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

Optionally, the device also includes:

A receiving unit, configured to receive configuration information sent by the network device, and the configuration information is used to configure at least one of the following:

a resource location of the preamble sequence, a sending period of the preamble sequence, a resource location of the user data, or a number of transmission times of the user data.

What needs to be explained here is that the terminal provided by the embodiment of the present disclosure can implement all the method steps implemented by the method embodiment, and can achieve the same technical effect. The same part and the beneficial effect are not described in detail.

Figure 7:
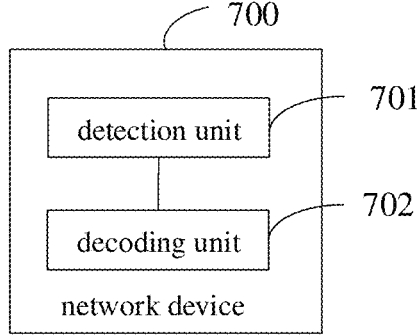
FIG. 7 is another structural diagram of a network device according to an embodiment of the present disclosure.

FIG. 7 is another structural diagram of a network device provided by an embodiment of the present disclosure. As shown in FIG. 7, a network device 700 includes:

A detection unit 701, configured to detect a preamble sequence sent by the terminal;

a decoding unit 702, configured to decode the preamble sequence to obtain the first bit;

Wherein, the first bit includes a cyclic redundancy check (CRC) bit of user data, and the user data includes at least one of user identity information and data.

Optionally, the first bit is the CRC bit; or the first bit is the CRC bit and a second bit, and the second bit includes a signature sequence number bit and a partial data bit of the user data, at least one of the control information bits corresponding to the user data.

Optionally, the device also includes:

an obtaining unit, configured to obtain user data sent by the terminal, wherein the sending format of the user data is a sending format determined based on the first bit;

The network device verifies the user data according to the first bit.

Optionally, the device also includes:

A first sending unit, configured to send, by the network device, confirmation information to the terminal if the verification is passed, wherein the confirmation information is used to instruct the network device to correctly receive the user data.

Optionally, the confirmation information is used to implicitly or explicitly indicate the sequence number of the preamble sequence.

Optionally, the obtaining unit is configured to obtain the user data sent by the terminal on K resources according to a PDMA mode or an NOMA mode;

Wherein, the PDMA sequence of the PDMA mode is determined based on the first bit, and the PDMA sequence includes K elements corresponding to the K resources in a one-to-one manner, and the transmission state of each resource in the K resources is determined by the corresponding element.

Optionally, the device also includes:

a second sending unit, configured to send configuration information to the terminal, wherein the configuration information is used to configure at least one of the following items:

a resource location of the preamble sequence, a sending period of the preamble sequence, a resource location of the user data, or a number of transmission times of the user data.

What needs to be explained here is that the network device provided by the embodiments of the present disclosure can implement all the method steps implemented by the method embodiments, and can achieve the same technical effect. The same parts and beneficial effects are not described in detail.

It should be noted that the division of the units in the embodiment of the present disclosure is schematic, and is only a logical function division, and there may be another division manner in actual implementation. In addition, each functional unit in each embodiment of the present disclsoure may be integrated into one processing unit, each unit may exist separately physically, or two or more units may be integrated into one unit. The integrated units can be implemented in the form of hardware or in the form of software functional units.

If the integrated unit is implemented in the form of a software function unit and sold or used as an independent product, it can be stored in a processor-readable storage medium. Based on this understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present disclosure. The storage medium include: U disk, mobile hard disk, read-only memory (ROM), random access memory (RAM), magnetic disk or optical disk and other media that can store program codes.

The embodiment of the present disclosure also provides a processor-readable storage medium, the processor-readable storage medium stores a computer program, and the computer program is used to enable the processor to execute the sequence transmission method provided by the embodiment of the present disclosure, Alternatively, the computer program is used to enable the processor to execute the sequence receiving method provided by the embodiments of the present disclosure.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to disk storage and optical storage, etc.) having computer-usable program code embodied therein.

The present disclosure is described with reference to flowchart illustrations and/or block diagrams of methods, apparatus (systems), and computer program products according to embodiments of the disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce device for realizing the functions specified in one or more procedures of a flowchart and/or one or more blocks of a block diagram.

These processor-executable instructions can also be loaded onto a computer or other programmable data processing device, causing a series of operational steps to be performed on the computer or other programmable device to produce a computer-implemented processing, the instructions executed on the computer and other programmable device provide steps for implementing the functions specified in one or more flows of the flowchart or one or more block in the block diagram.

It should be noted that it should be understood that the division of the above modules is only a division of logical functions, and may be fully or partially integrated into a physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the determining module may be a separate processing element, or may be integrated in a chip of the device. In addition, it may be stored in the memory of the device in the form of program code, and a certain processing element of the device may call and execute the functions of the modules identified above. The implementation of other modules is similar. In addition, all or part of these modules can be integrated together, and can also be implemented independently. The processing element mentioned here may be an integrated circuit with signal processing capability. In the implementation process, each step of the above method or each module above can be completed by an integrated logic circuit of hardware in the processor element or an instruction in the form of software.

For example, each module, unit, subunit or submodule may be one or more integrated circuits configured to implement the above method, for example: one or more specific integrated circuits (Application Specific Integrated Circuit, ASIC), or, one or Multiple microprocessors (digital signal processor, DSP), or, one or more field programmable gate arrays (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The terms "first", "second" and the like in the specification and claims of the present disclosure are used to distinguish similar objects, and are not necessarily used to describe a specific order or sequence. It should be understood that the data so used may be interchanged under appropriate circumstances such that the embodiments of the disclosure described herein are practiced, for example, in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus. In addition, the use of "and/or" in the description and claims means at least one of the connected objects, such as A and/or B and/or C, means that it includes A alone, B alone, C alone, and both A and B, both B and C, both A and C, and A, B, and C all exist, there are 7 situations. Similarly, the use of "at least one of A or B" in the present disclosure and claims should be understood as "A alone, B alone, or both A and B".

Obviously, those skilled in the art can make various changes and modifications to the present disclosure without departing from the spirit and scope of the present disclosure. In this way, if these change and modifications fall within the scope of the claims of the present disclosure and their equivalence, the present disclosure is also intended to include these change and modifications.

What is claimed is:

1. A sequence transmission method, comprising:
sending, by a terminal, a preamble sequence to a network device;
wherein the preamble sequence is determined based on a first bit, and the first bit includes a cyclic redundancy check (CRC) bit obtained by performing CRC encoding on user data, the user data includes at least one of user identity information or data, and the user data does not comprise the CRC bit;
wherein the preamble sequence includes:
a preamble sequence or a preamble sequence set determined according to an encoded codeword of the first bit;
wherein the encoded codeword includes:
a codeword obtained by encoding the first bit; or
segments of a codeword obtained by encoding the first bit; or
codewords respectively obtained by encoding segments of the first bits; or
a concatenation of codewords respectively obtained by encoding the segments of the first bits.

2. The method according to claim 1, wherein the first bit is the CRC bit; or the first bit is the CRC bit and a second bit, and the second bit includes at least one of a signature sequence number bit, partial data bits of the user data, and a control information bit corresponding to the user data.

3. The method according to claim 1, further comprising:
sending, by the terminal, the user data to the network device, wherein a sending format of the user data is a sending format determined based on the first bit, and the user data is encoded without encoding the CRC bit.

4. The method according to claim 3, wherein the sending, by the terminal, user data to the network device comprises:
sending the user data to the network device on K resources using a Pattern Division Multiple Access (PDMA) mode or a non-orthogonal multiple access (NOMA) mode, wherein K is an integer greater than or equal to 1;
wherein, a PDMA sequence of the PDMA mode is determined based on the first bit, and the PDMA sequence includes K elements corresponding to the K resources in a one-to-one manner, and a transmission state of each resource in the K resources is determined by a corresponding element.

5. The method according to claim 1, wherein the sending, by the terminal, the preamble sequence to the network device, includes:
sending periodically, by the terminal, the preamble sequence to the network device until a number of sending times of the preamble sequence reaches a maximum number or receives confirmation information sent by the network device, wherein the confirmation information is used to indicate that the network device correctly receives the user data.

6. The method according to claim 5, further comprising:
detecting, by the terminal, the confirmation information sent by the network device within a time window;
wherein the confirmation information is used to implicitly or explicitly indicate a sequence number of the preamble sequence.

7. The method according to claim 1, further comprising:
receiving, by the terminal, configuration information sent by the network device, wherein the configuration information is used to configure at least one of the following:

a resource location of the preamble sequence, a sending period of the preamble sequence, a resource location of the user data, or a number of transmission times of the user data.

8. A sequence receiving method, comprising:
detecting, by a network device, a preamble sequence sent by a terminal;
decoding, by the network device, the preamble sequence to obtain a first bit;
wherein, the first bit includes a cyclic redundancy check (CRC) bit obtained by performing CRC encoding on user data, the user data includes at least one of user identity information or data, and the user data does not comprise the CRC bit;
wherein the preamble sequence includes:
a preamble sequence or a preamble sequence set determined according to an encoded codeword of the first bit;
wherein the encoded codeword includes:
a codeword obtained by encoding the first bit; or
segments of a codeword obtained by encoding the first bit; or
codewords respectively obtained by encoding segments of the first bits; or
a concatenation of codewords respectively obtained by encoding the segments of the first bits.

9. The method according to claim 8, wherein the first bit is the CRC bit; or the first bit is the CRC bit and a second bit, and the second bit includes at least one of a signature sequence number bit, partial data bits of the user data, a control information bis corresponding to the user data.

10. The method according to claim 8, further comprising:
obtaining, by the network device, the user data sent by the terminal, wherein a sending format of the user data is a sending format determined based on the first bit, and the user data is encoded without encoding the CRC bit;
verifying, by the network device, the user data according to the first bit.

11. The method according to claim 10, further comprising:
if the verification is passed, sending, by the network device, confirmation information to the terminal, wherein the confirmation information is used to instruct the network device to correctly receive the user data.

12. The method according to claim 11, wherein the confirmation information is used to implicitly or explicitly indicate a sequence number of the preamble sequence.

13. The method according to claim 10, wherein the obtaining, by the network device, user data sent by the terminal includes:
obtaining, by the network device, the user data sent by the terminal on K resources according to a PDMA mode or an NOMA mode;
wherein, a PDMA sequence of the PDMA mode is determined based on the first bit, and the PDMA sequence includes K elements corresponding to the K resources in a one-to-one manner, and a transmission state of each resource in the K resources is determined by a corresponding element.

14. The method according to claim 8, further comprising:
sending, by the network device, configuration information to the terminal, wherein the configuration information is used to configure at least one of the following:
a resource location of the preamble sequence, a sending period of the preamble sequence, a resource location of the user data, or a number of transmission times of the user data.

15. A terminal, comprising: a memory, a transceiver, and a processor, wherein:

the memory is used to store computer programs; the transceiver is used to send and receive data under the control of the processor; the processor is used to read the computer programs in the memory and perform the following operations:

sending a preamble sequence to a network device;

wherein the preamble sequence is determined based on a first bit, and the first bit includes a cyclic redundancy check (CRC) bit obtained by performing CRC encoding on user data, the user data includes at least one of user identity information or data, and the user data does not comprise the CRC bit;

wherein the preamble sequence includes:

a preamble sequence or a preamble sequence set determined according to an encoded codeword of the first bit;

wherein the encoded codeword includes:

a codeword obtained by encoding the first bit; or segments of a codeword obtained by encoding the first bit; or codewords respectively obtained by encoding segments of the first bits; or a concatenation of codewords respectively obtained by encoding the segments of the first bits.

16. The terminal according to claim 15, wherein the first bit is the CRC bit; or the first bit is the CRC bit and a second bit, and the second bit includes at least one of a signature sequence number bit, partial data bits of the user data, and a control information bit corresponding to the user data.

17. A network device, comprising: a memory, a transceiver, and a processor, wherein:

the memory is used to store computer programs; the transceiver is used to send and receive data under the control of the processor; the processor is used to read the computer programs in the memory and perform the sequence receiving method according to claim 8.

18. The network device according to claim 17, wherein the first bit is the CRC bit; or the first bit is the CRC bit and a second bit, and the second bit includes at least one of a signature sequence number bit, partial data bits of the user data, a control information bis corresponding to the user data.

* * * * *